W. E. HOLDERMAN.
FILTERING APPARATUS.
APPLICATION FILED JUNE 26, 1913.
1,146,256.
Patented July 13, 1915.
2 SHEETS—SHEET 1.
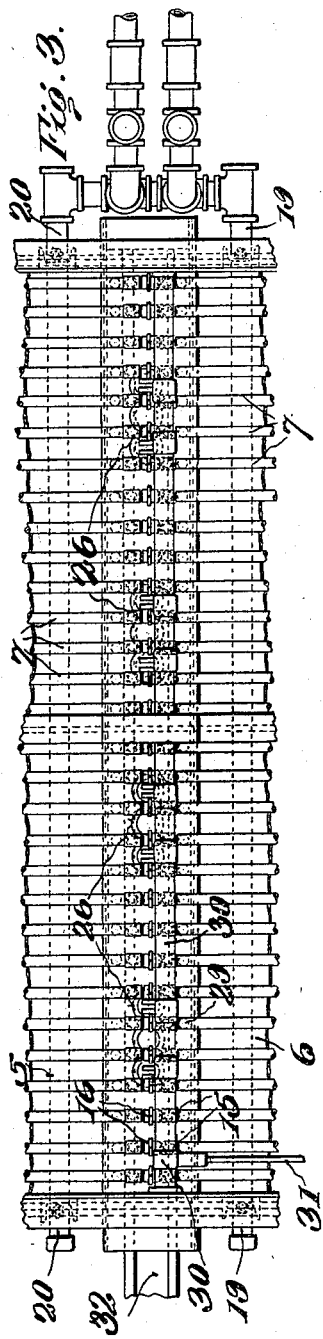
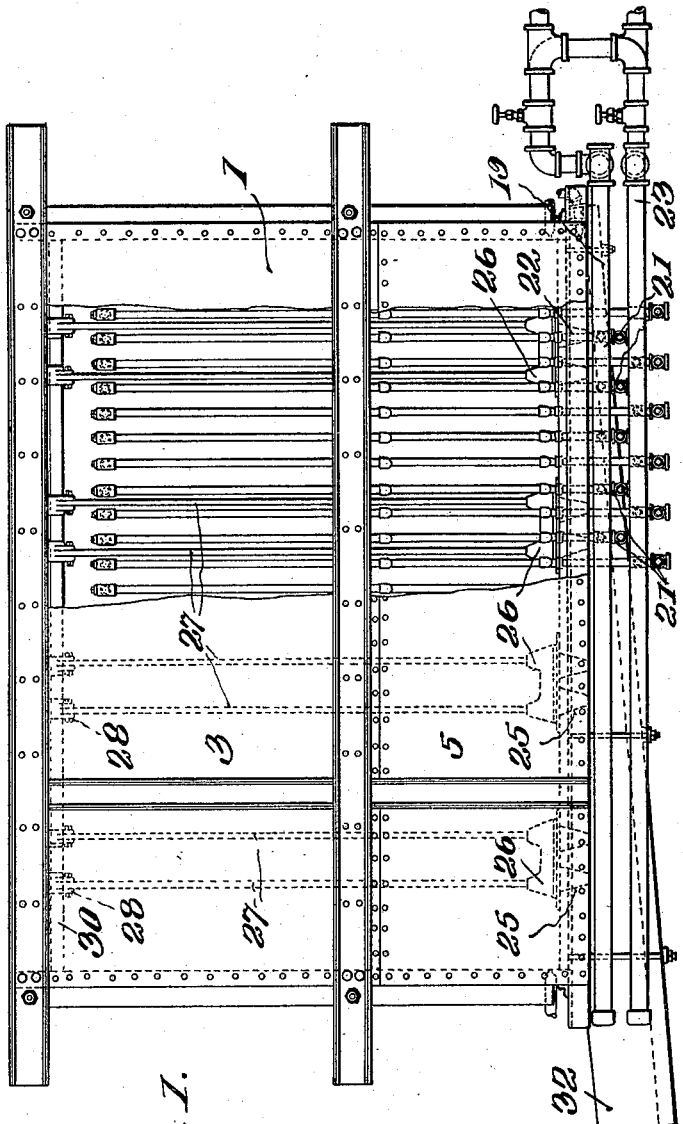
Witnesses
Inventor
William E. Holderman
By Clark, Prentiss & Clark
Attorney

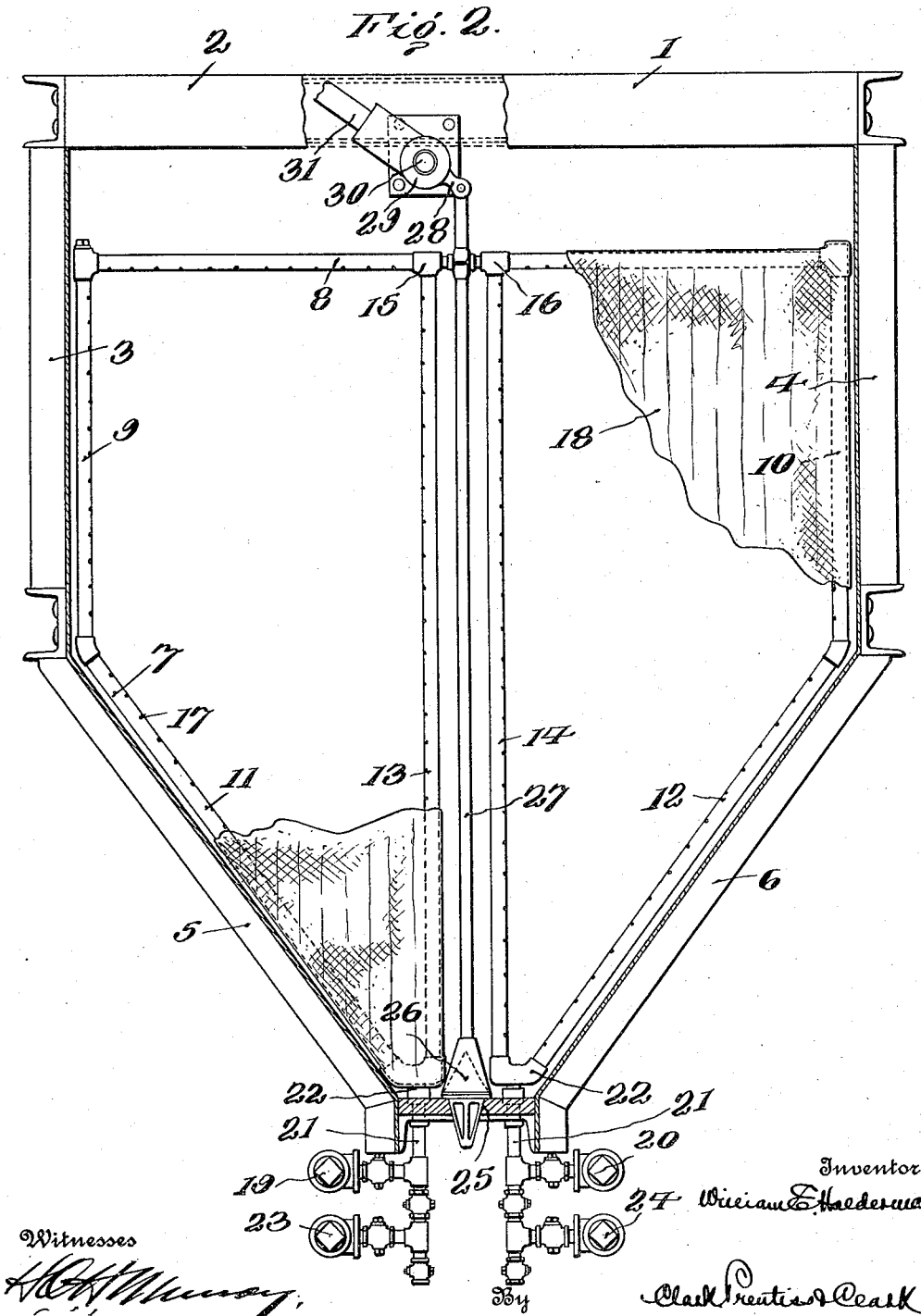

UNITED STATES PATENT OFFICE.

WILLIAM E. HOLDERMAN, OF SALT LAKE CITY, UTAH.

FILTERING APPARATUS.

1,146,256.   Specification of Letters Patent.   Patented July 13, 1915.

Application filed June 26, 1913. Serial No. 775,987.

*To all whom it may concern:*

Be it known that I, WILLIAM E. HOLDERMAN, a citizen of the United States, residing at Salt Lake City, in the county of Salt Lake and State of Utah, have invented new and useful Improvements in Filtering Apparatus, of which the following is a specification.

This invention has reference to improvements in a device adapted for the treatment of ore, and more particularly to the extraction of metal from ore by the cyanid process.

One of the objects of this invention is the provision of a filtering medium which will operate to a maximum degree of efficiency in the separation of the filtrate from the residue, and at the same time to provide for the introduction of wash water for flushing purposes.

A further object of this invention is the provision of an improved valve structure whereby the apparatus may be thoroughly drained from all its points thereof of the residue accumulated therein during the carrying on of the process. It is the aim of the present invention to provide means for carrying out the draining of the apparatus by the operation of a single lever thus reducing the number of attendants required, and accomplishing a consequent reduction in expense.

A still further object is to provide suitable valve structure permitting the introduction of wash water in one part of the apparatus, while the filtering operation is being carried on in the other, thus obtaining a more efficient separation of the filtrate from the residue.

For a full understanding of the invention, reference is made to the accompanying drawings, which illustrate a structural embodiment thereof, in a preferred form.

Figure 1 is a side elevation of the improved apparatus with a portion broken away to show the filtering medium therein; Fig. 2 is an end elevation, partly in section, showing the filtering medium more in detail, and also the improved valve mechanism; and Fig. 3 is a plan of the apparatus, showing in detail the valve mechanism.

Referring more particularly to the drawings, a tank is indicated at 1, which may be of any suitable construction, but preferably pentagonal in shape, having the top wall 2 and the side walls 3 and 4 at right angles to the said top wall, and the two bottom walls 5 and 6 sloping toward each other to form a trough-like cavity in the lower portion of the tank.

Disposed within the tank 1 and spaced at intervals therein are a plurality of filtering partitions 7, formed of a framework of jointed piping covered with a suitable filtering fabric. This frame-work consists of a horizontal pipe 8 running parallel to the top 2 of the tank and extending from end to end thereacross. Secured to each end of the horizontal pipe 8 by any suitable coupling means, and disposed at right angles thereto are the vertical pipes 9 and 10, which are in turn, coupled at their lower ends thereof to the inwardly extending pipes 11 and 12, the opposite ends of which are secured to a pair of vertical pipes 13 and 14, extending upwardly on each side of the vertical center line of the frame-work and jointed respectively at 15 and 16 to the horizontal pipe 8. It will be noted that there is thus obtained a continuous circulation of fluid throughout the entire framework, permitting fluid pressure or suction to be applied at all points thereof, as may be desired. A series of perforations 17, spaced at intervals throughout the framework permit the introduction of fluid into the interior of the partition in a fine spray-like condition, as well as an equal distribution of the filtering or suction process carried on therein. To constitute the filtering means, the opposite halves of the framework extending from the pipes 10 to 14 and the pipes 9 to 13, respectively, are enveloped in any suitable porous material 18, which will offer the proper resistance to the passing of solids. This material may be secured to the framework in any convenient manner, in the present instance, by stitching.

Extending beneath the tank on opposite sides thereof, is a pair of pipes 19 and 20, having a series of upstanding couplings 21, projecting into the tank and connecting at 22 with each half of the framework of each alternate filter leaf. Suitable connections lead to a pair of pumps, not shown, which operate to introduce wash water into one series, while drawing out the filtrate from the alternate series. Similar connections 23, and 24, with the pumps are provided for the other series of leaves. It will be noted that by the provision of separable connections of each half of the leaf with the pumps, a dual action may be carried on in each leaf.

Located within the tank, and on its bottom wall thereof, are a series of valve openings 25, which form seats for the valve pistons 26, carried by the end of the stems 27 centrally located within the tank, and extending nearly to the top thereof. Pivoted to the upper end of the stems are the links 28, formed with collars 29, keyed on the common shaft 30, which is journaled for rocking movement in suitable bearings located at each end of the tank. A lever 31 serves to rock the shaft 30 and thus operates to open and close the series of valves 26 located in the bottom of the tank. It will thus be seen that, by the operation of a single lever, the tank may be drained, from all its points thereof, of the residue accumulated during the working of the process, and without any interruption.

A suitable trough 31, extending beneath the tank, is provided for the reception of the residue.

Although the particulars of the present invention have been fully set forth, yet it is to be understood that it is capable of wide application, and that the invention is not limited to the structure herein described, but, on the contrary, may include any modification, without departing from the scope thereof.

What is claimed is:

1. In a tank, a filtering partition within said tank comprising an angular framework of perforated piping divided longitudinally into two sections, the top pipe of the framework being common to both sections, cover of filtering fabric stretched across each frame, and means for causing a flow of fluid into and from said partition.

2. In a tank, a series of filtering partitions mounted therein, each consisting of a pair of sections spaced apart, the bottom of the tank being provided with a plurality of outlets, valve pistons operable in the outlets, stems operable in the space between said sections, said stems having their lower ends connected to the valve pistons, and means for simultaneously reciprocating said stems.

In testimony whereof I affix my signature in presence of two witnesses.

WILLIAM E. HOLDERMAN.

Witnesses:
A. M. CLARKE,
DEAN F. BRAYTON.

Copies of this patent may be obtained for five cents each, by addressing the "Commissioner of Patents, Washington, D. C."